(12) United States Patent
Shin

(10) Patent No.: US 10,456,905 B2
(45) Date of Patent: Oct. 29, 2019

(54) MODULAR ROBOTICS SYSTEM BASED ON IOT

(71) Applicant: CUBROID, INC., Bucheon-si (KR)

(72) Inventor: Jae Kwang Shin, Incheon (KR)

(73) Assignee: CUBROID, INC., Bucheon-si (KR)

( * ) Notice: Subject to any disclaimer, the term of this patent is extended or adjusted under 35 U.S.C. 154(b) by 261 days.

(21) Appl. No.: 15/535,409

(22) PCT Filed: Nov. 25, 2016

(86) PCT No.: PCT/KR2016/013729
§ 371 (c)(1),
(2) Date: Jun. 13, 2017

(87) PCT Pub. No.: WO2017/213312
PCT Pub. Date: Dec. 14, 2017

(65) Prior Publication Data
US 2018/0193998 A1   Jul. 12, 2018

(30) Foreign Application Priority Data

Jun. 9, 2016  (KR) ........................ 10-2016-0071630

(51) Int. Cl.
| G06F 19/00 | (2018.01) |
| B25J 3/00 | (2006.01) |
| A63H 33/26 | (2006.01) |
| A63H 33/04 | (2006.01) |
| A63H 33/08 | (2006.01) |

(Continued)

(52) U.S. Cl.
CPC .............. *B25J 3/00* (2013.01); *A63H 33/042* (2013.01); *A63H 33/086* (2013.01); *A63H 33/088* (2013.01); *A63H 33/26* (2013.01); *B25J 9/08* (2013.01); *B25J 19/005* (2013.01);
(Continued)

(58) Field of Classification Search
CPC ... B25J 3/00; B25J 9/08; B25J 19/005; A63H 33/086; A63H 33/042; A63H 33/088; A63H 33/26; A63H 2200/00; H04L 67/12; Y10S 901/46; Y10S 901/23
See application file for complete search history.

(56) References Cited

U.S. PATENT DOCUMENTS

| 7,834,715 B2 * | 11/2010 | Sanji ........................ H04B 3/50 333/24 R |
| 7,973,425 B2 * | 7/2011 | Chen ...................... H01R 13/70 307/12 |
| 8,373,527 B2 * | 2/2013 | Fullerton ................ H01F 7/021 335/285 |

(Continued)

FOREIGN PATENT DOCUMENTS

| KR | 10-1999-0073551 A | 10/1999 |
| KR | 10-2012-0130420 A | 12/2012 |

(Continued)

OTHER PUBLICATIONS

NPL: KR210-2012-0130420MT (Year: 2012).*
Naver Blog, "Lego wireless LED lighting system—Orios," Aprl. 25, 2016.

*Primary Examiner* — Ian Jen
(74) *Attorney, Agent, or Firm* — Lex IP Meister, PLLC

(57) ABSTRACT

The present disclosure relates to an IoT-based modular robotics system where a function button for changing from a program mode to an automatic mode is installed in a master block, enabling instant execution of the automatic mode in the master block.

8 Claims, 8 Drawing Sheets

(51) Int. Cl.
  *B25J 9/08* (2006.01)
  *B25J 19/00* (2006.01)
  *H04L 29/08* (2006.01)

(52) U.S. Cl.
  CPC .......... *A63H 2200/00* (2013.01); *H04L 67/12* (2013.01); *Y10S 901/23* (2013.01); *Y10S 901/46* (2013.01)

(56) References Cited

U.S. PATENT DOCUMENTS

| | | | | |
|---|---|---|---|---|
| 8,599,769 | B2* | 12/2013 | Yang | H04L 12/66 |
| | | | | 370/252 |
| 8,851,953 | B2* | 10/2014 | Oschuetz | A63H 33/042 |
| | | | | 446/91 |
| 9,100,103 | B2* | 8/2015 | Okada | H04B 3/542 |
| 9,177,246 | B2* | 11/2015 | Buibas | G06N 3/08 |
| 9,287,208 | B1* | 3/2016 | Khare | H01L 23/5221 |
| 9,299,029 | B1* | 3/2016 | Kim | G06N 5/04 |
| 9,353,514 | B1* | 5/2016 | Wine | G06Q 50/08 |
| 10,111,277 | B2* | 10/2018 | Deros | H04W 4/00 |
| 10,149,335 | B2* | 12/2018 | Gujral | H04W 4/70 |
| 10,298,693 | B2* | 5/2019 | Kato | H04L 67/125 |
| 10,313,432 | B2* | 6/2019 | Chen | H04L 67/1002 |
| 10,346,332 | B2* | 7/2019 | Tanabe | G06F 9/44505 |
| 2014/0244568 | A1* | 8/2014 | Goel | H04W 4/08 |
| | | | | 706/52 |

FOREIGN PATENT DOCUMENTS

| | | |
|---|---|---|
| KR | 10-2013-0068940 A | 6/2013 |
| KR | 10-2015-0122471 A | 11/2015 |

\* cited by examiner (a)

(b)

(c)

(d)

DC MOTOR MODULE (a)  LED MODULE (b)  BUZZER MODULE (c)

TOUCH SENSOR MODULE (d)  VARIABLE RESISTIVE MODULE (e)

MODULAR ROBOTICS SYSTEM BASED ON IOT

CROSS-REFERENCE TO RELATED APPLICATION

This application is a national Stage Patent Application of PCT International Patent Application No. PCT/KR2016/013729, filed on Nov. 25, 2016 under 35 U.S.C. § 371, which claims priority of Korean Patent Application No. 10-2016-0071630, filed on Jun. 9, 2016, which are all hereby incorporated by reference in their entirety.

1. FIELD

Various embodiments of the present invention relate to an IoT-based modular robotics system, and more particularly, to an IoT-based modular robotics system where a function button for changing from a program mode to an automatic mode is installed in a master block provided to transmit information for operating a slave block, enabling instant execution of the automatic mode in the master block.

2. BACKGROUND

There are various types of toys for children and students, but especially, the types of toys consisting of a plurality of blocks that can be assembled in various forms have been favored by children and students from long before. The products of LEGO are most famous for such types of toys consisting of a plurality of blocks that can be assembled in various forms.

IoT (Internet of Things) technology refers to a technology of connecting, via network, not only home appliances, electronic devices but also devices of various fields such as health care devices, remote meter reading devices, smart home devices, and smart car devices and the like, to share information, and due to the recent activation of large scale distribution of such IoT technology and computer programming coding education for children and students, studies attempting to combine this technology to toys for children and students as well are actively underway.

Due to these studies, products have recently been developed, that allow wireless communication and control between a plurality of blocks, and also products where children and students can directly input programs that they coded. However, the procedures for inputting these programs in such products are difficult, and there is inconvenience and difficulty in converting from a program mode to an automatic mode in the blocks themselves, thus causing a problem of undermining stimulation of interest from children and students.

SUMMARY

A purpose of the present disclosure is to solve the aforementioned problems of prior art, that is, to install, in a master block provided to transmit information for operating a slave block, a function button for changing from a program mode to an automatic mode, so as to provide an IoT-based modular robotics system where execution of the automatic mode can be instantly performed in the master block.

The aforementioned purpose is achieved by an IoT-based modular robotics system according to the present disclosure, the system including a master block for receiving input of a program edited by a user and a predetermined program, and for executing the program edited by the user and the predetermined program, and which is provided with a function button for changing from a program mode that is a mode for executing the program edited by the user to an automatic mode that is a mode for executing the predetermined program; a slave block that is electrically connected to the master block to receive information from the master block to execute operation of the slave block, or to transmit information to the master block; and a connecting block that mutually connects the master block and the slave block, or mutually connects a plurality of slave blocks.

Further, the slave block may have, on an exterior surface of the slave block, an execution button for executing communication connection of the master block and the slave block, and the execution button may execute operation of the slave block when pressed by external force in a case where the master block is being executed in the automatic mode.

Further, the slave block may be provided as one of an actuator module or a sensor module.

Further, the master block may be provided as a polyhedron having a plurality of surfaces, a first protrusion formed on any one surface of the plurality of surfaces, the slave block may be provided as a polyhedron having a plurality of surfaces, a second protrusion formed on any one surface of the plurality of surfaces, and the connecting block may have a groove corresponding to the protrusion on one surface and on another surface of the connecting block such that the surface where the first protrusion is formed and the surface where the second protrusion is formed are coupled to each other while facing each other.

Further, the present disclosure may further include a terminal unit for driving a scratch program provided for a user to edit the program.

Further, when there are a plurality of slave blocks, the master block may attempt communication connection to the slave block located in a closest distance, of the plurality of slave blocks.

Further, the function button may perform changing of a mobile mode that is a mode for controlling the master block in a mobile terminal.

Further, the master block and the slave block may charge electric power in a magnetic induction method.

Further, the present disclosure may further include a battery block coupled to the master block or to the slave block to transmit electric power to the master block and the slave block.

According to the present disclosure, when using the function button, it is possible to instantly execute the automatic mode in a state where the program mode is being executed, and thus there is an advantage of not having to perform an additional operation in a PC in order to execute the automatic mode while the program mode is being executed. This advantage improves user convenience, and accordingly, amplifies users' interests, thereby providing an effect of inducing continued learning by users.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural form as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, the IoT-based modular robotics system according to an embodiment of the present disclosure will be explained in detail with reference to the drawings attached.

Figure 1:
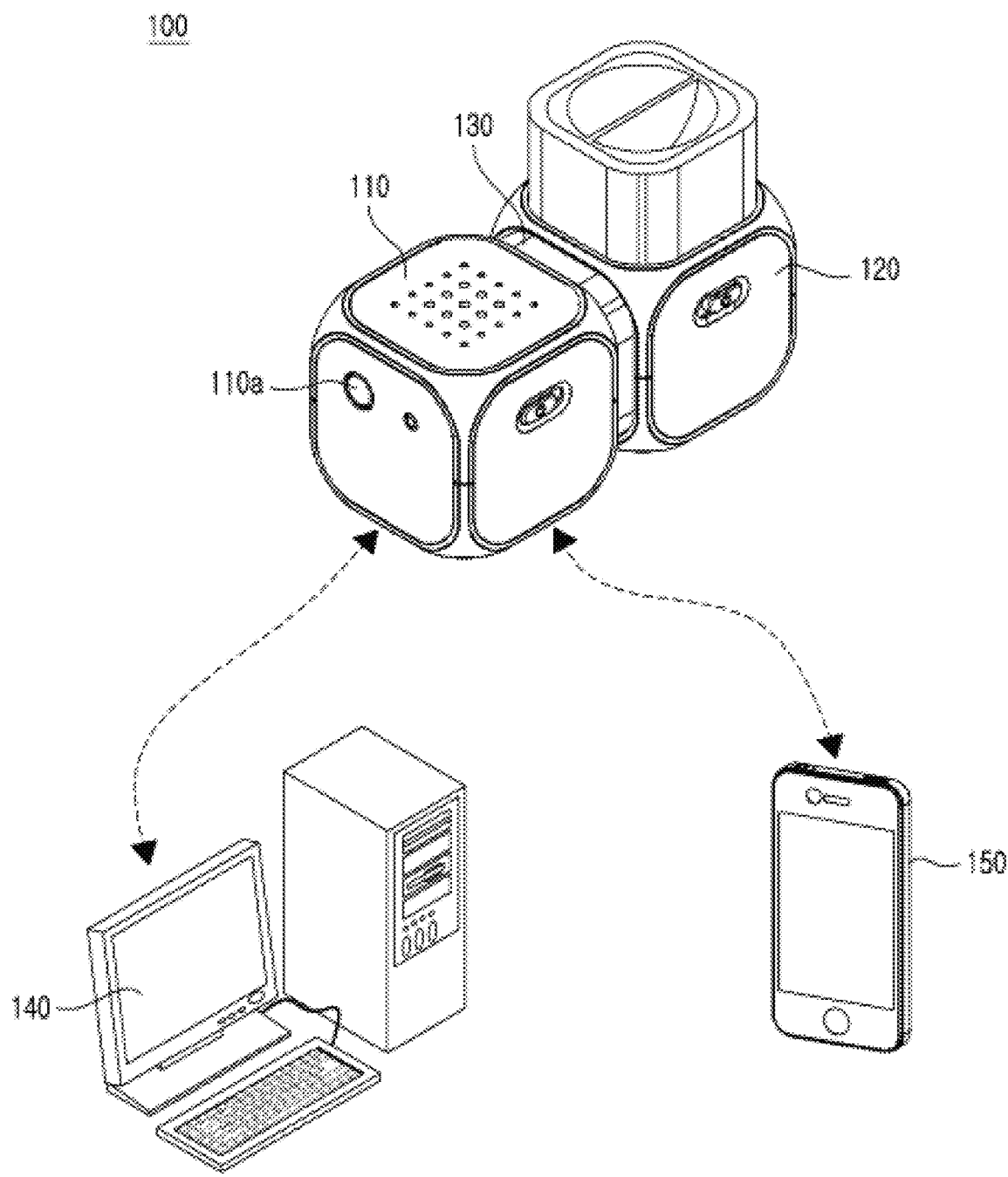
FIG. 1 is a view illustrating the overall configuration of an IoT-based modular robotics system according to an embodiment of the present disclosure.
Figure 2:
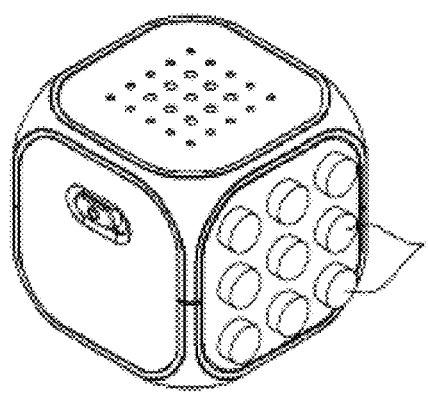
FIG. 2 is a view individually illustrating configurations of the IoT-based modular robotics system according to an embodiment of the present disclosure.
Figure 2:
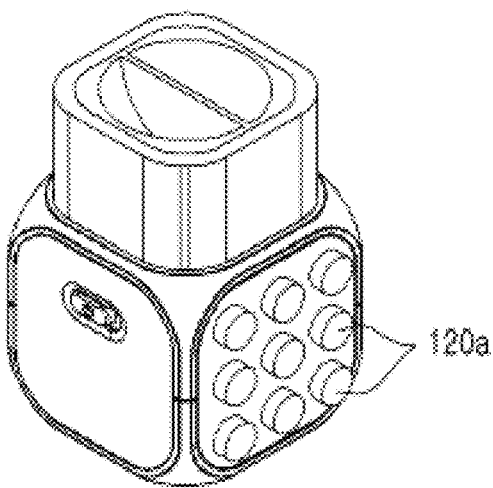
Figure 2:
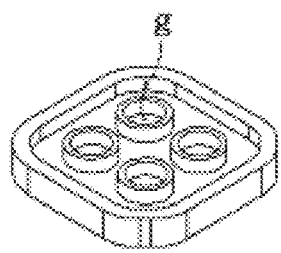
Figure 2:
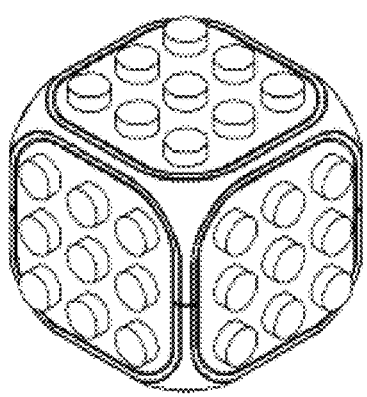
Figure 3:
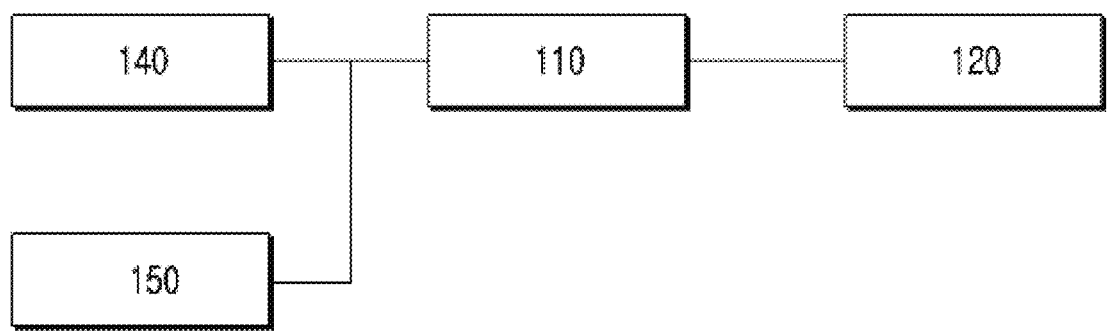
FIG. 3 is a view illustrating the electric connection between configurations of the IoT-based modular robotics system according to an embodiment of the present disclosure.
Figure 4:
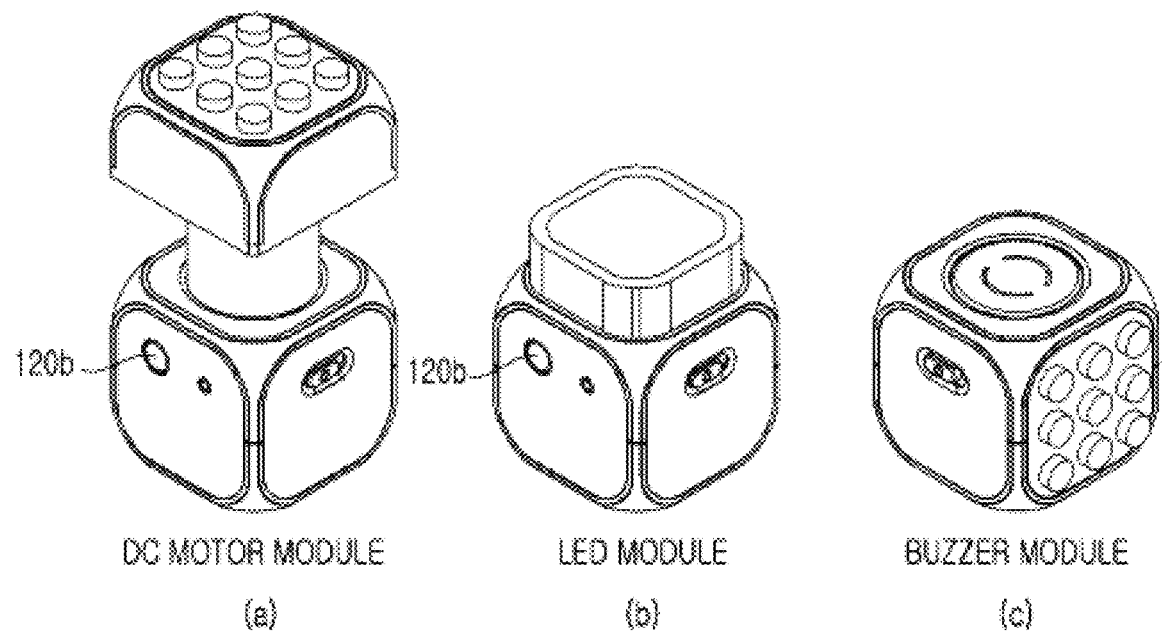
FIG. 4 is a view illustrating different types of slave blocks of the IoT-based modular robotics system according to an embodiment of the present disclosure.
Figure 4:
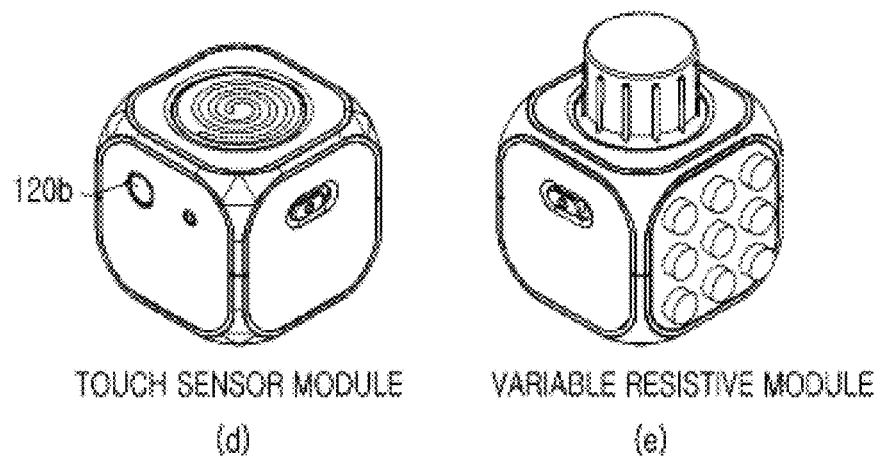
Figure 5:
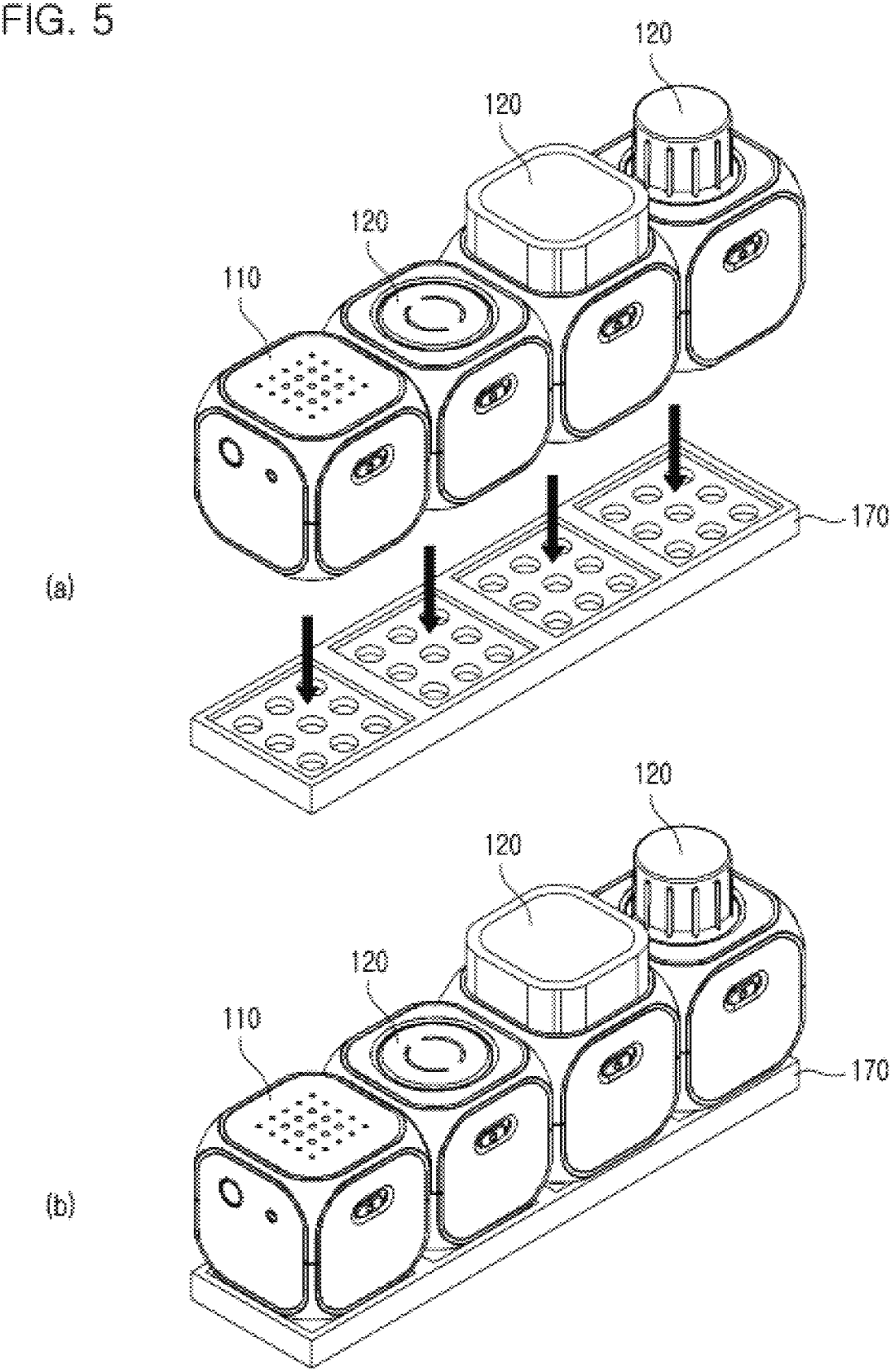
FIG. 5 is a view illustrating a master block and a slave block of the IoT-based modular robotics system being stored in a case unit according to an embodiment of the present disclosure.
Figure 6:
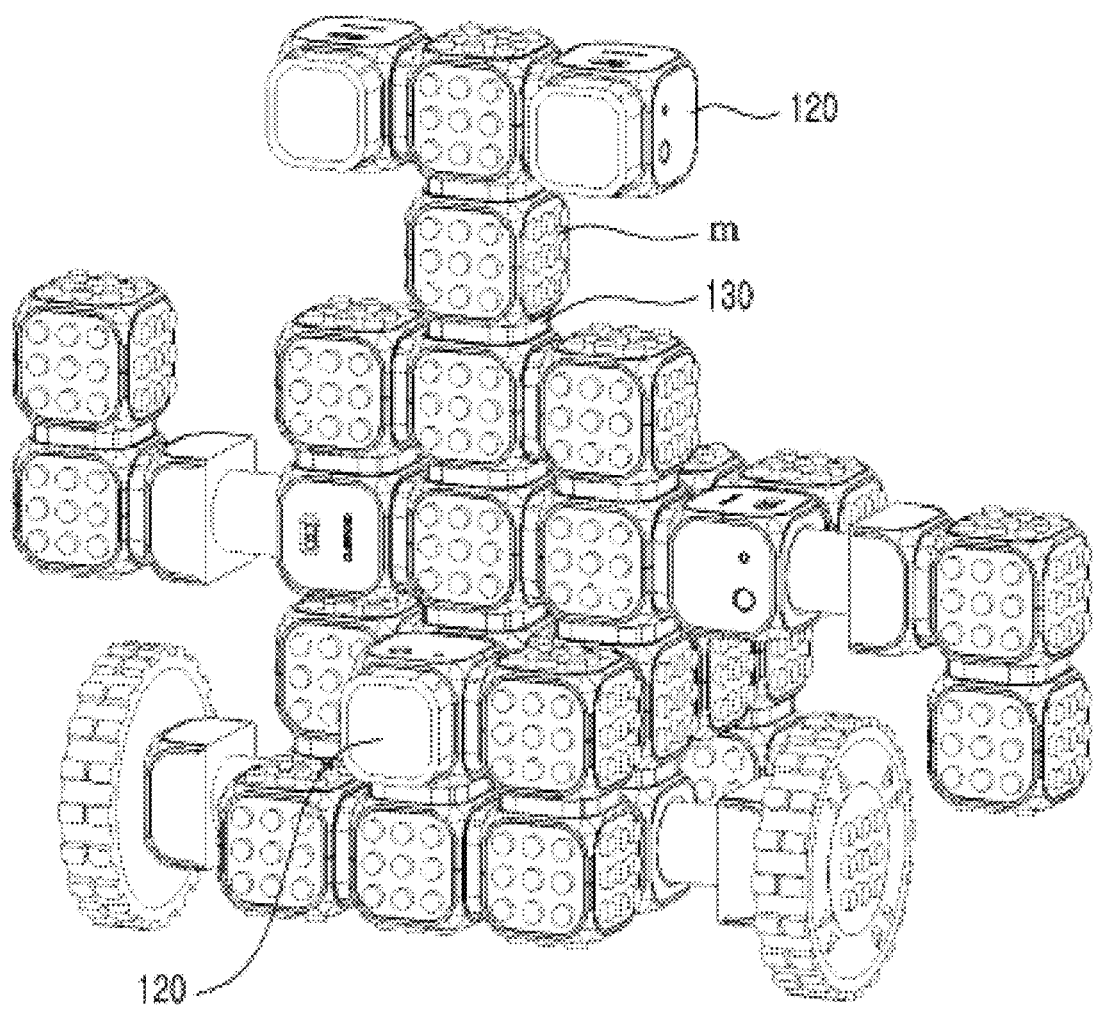
FIG. 6 is a view illustrating an example of a result assembled using the IoT-based modular robotics system according to an embodiment of the present disclosure.
Figure 7:
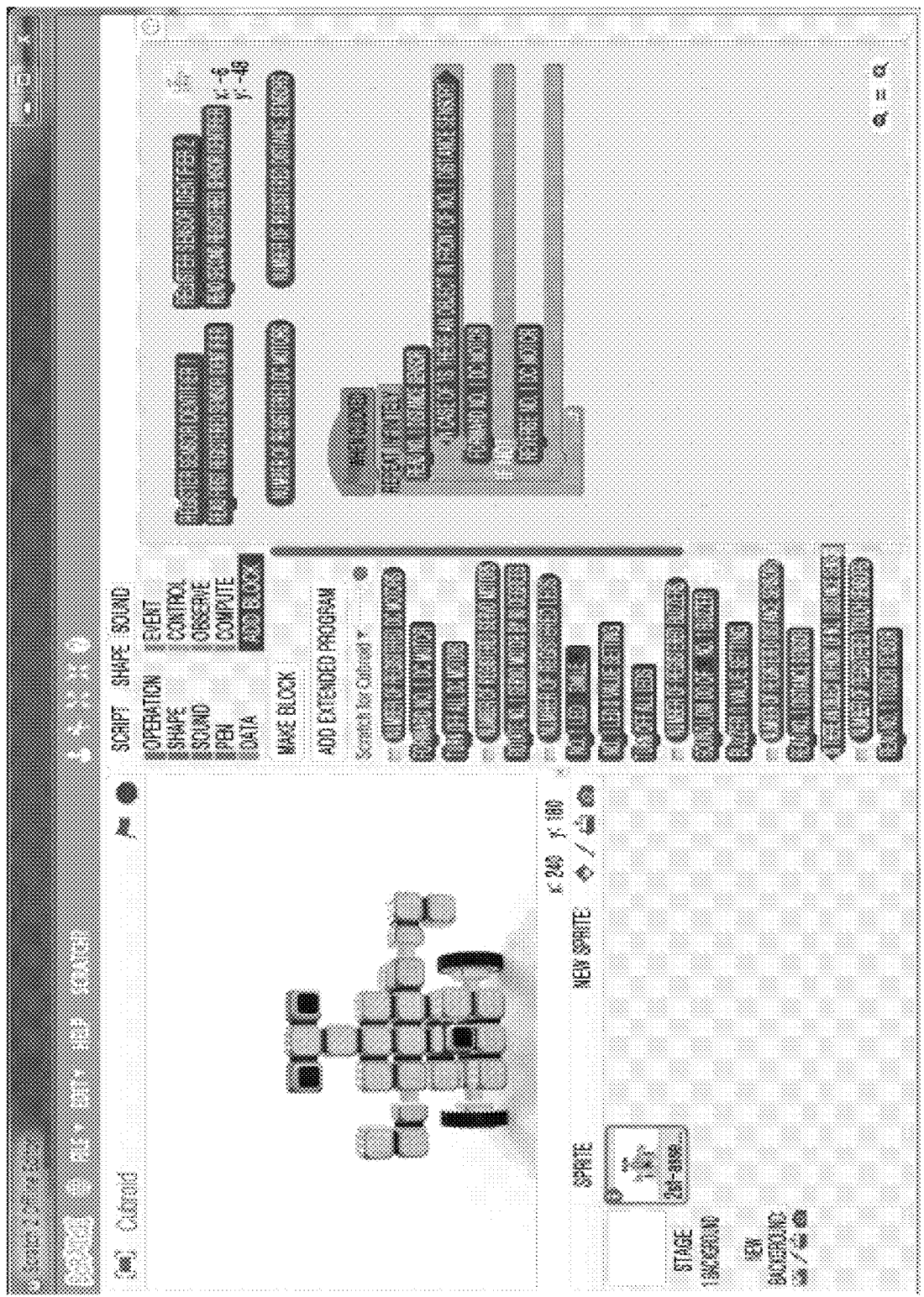
FIG. 7 is a view illustrating a screen of a scratch program that a terminal unit of the IoT-based modular robotics system provides according to an embodiment of the present disclosure.
Figure 8:
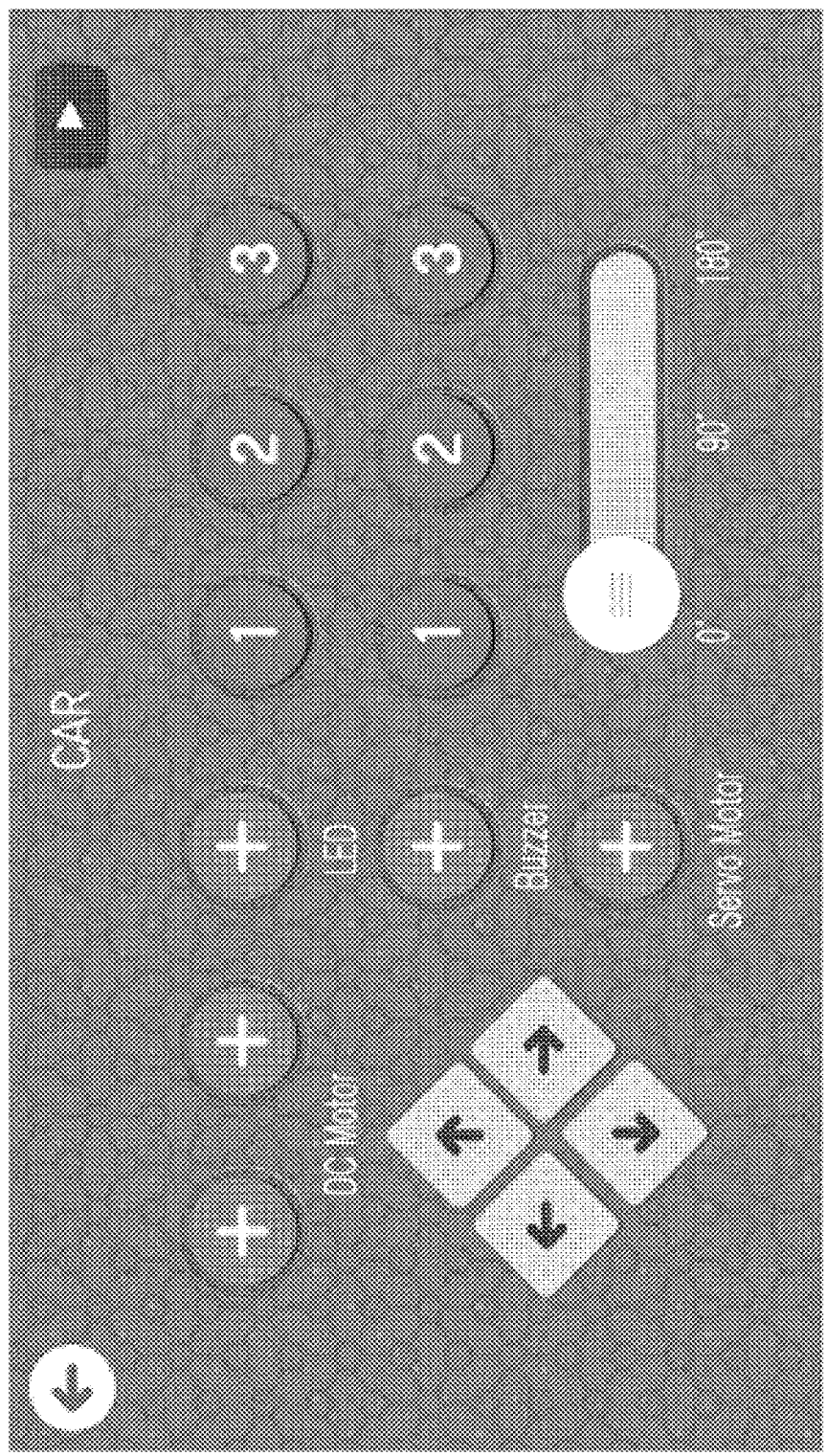
FIG. 8 is a view illustrating a control screen that a mobile terminal of the IoT-based modular robotics system provides according to an embodiment of the present disclosure.

FIG. 1 is a view illustrating the overall configuration of an IoT-based modular robotics system according to an embodiment of the present disclosure; FIG. 2 is a view individually illustrating configurations of the IoT-based modular robotics system according to an embodiment of the present disclosure; FIG. 3 is a view illustrating the electric connection between configurations of the IoT-based modular robotics system according to an embodiment of the present disclosure; FIG. 4 is a view illustrating different types of slave blocks of the IoT-based modular robotics system according to an embodiment of the present disclosure; FIG. 5 is a view illustrating a master block and a slave block of the IoT-based modular robotics system being stored in a case unit according to an embodiment of the present disclosure; FIG. 6 is a view illustrating an example of a result assembled using the IoT-based modular robotics system according to an embodiment of the present disclosure; FIG. 7 is a view illustrating a screen of a scratch program that a terminal unit of the IoT-based modular robotics system provides according to an embodiment of the present disclosure; and FIG. 8 is a view illustrating a control screen that a mobile terminal of the IoT-based modular robotics system provides according to an embodiment of the present disclosure.

As illustrated in FIGS. 1 to 8, the IoT-based modular robotics system 100 according to an embodiment of the present disclosure includes a master block 110, a slave block 120, a connecting block 130, a terminal unit 140 and a mobile terminal 150.

The master block 110 is for receiving input of a program edited by a user and a predetermined program, and for executing the program edited by the user and the predetermined program. The master block 110 is electrically connected with the slave block 120 that will be explained hereinafter in detail, and is also electrically connected with the terminal unit 140 and the mobile terminal 150.

Such a master block 110 may be provided as a polyhedron having a plurality of surfaces, and on one or more of the plurality of surfaces, a plurality of first protrusions 110b may be formed. Such a first protrusion 110b may be inserted into a groove g formed on one surface of the connecting block 130 that will be explained hereinafter. Meanwhile, into a groove g formed on another surface of the connecting block 130, a second protrusion 120b formed on one surface of the slave block 120 that will be explained hereinafter may be inserted, and by this coupling, the master block 110 and the slave block 120 may be physically connected to each other.

Meanwhile, on an exterior surface of such a master block 110, a function button 110a is provided for execution of conversion from a program mode, that is a mode for executing a program edited by a user, to an automatic mode, that is a mode for executing a predetermined program.

Here, the program mode refers to a mode for executing the program edited by the user in an computing area and a processing area of an electric circuit board inside the master block 110. Such a program may be written by a scratch program, that is a coding program, being executed in the terminal unit 140 that will be explained hereinafter.

Scratch refers to a programming language (that may be written by a language called squeak-based small talk) and environment for education designed for the purpose of allowing children and students to accumulate the experience of computer programming through a graphic environment. It is suitable to beginners in programming since it allows programming by drawing blocks and building up a tower with the blocks unlike in C++, C# and visual basics, etc.

Further, here, the automatic mode refers to a mode for executing a basic program stored in a storage area of the electric circuit board inside the master block 110, in the computing area and the processing area of the electric circuit board inside the master block 110.

Such a function button 110a is electrically connected with the electric circuit board inside the master block 110. When the function button 110a is pressed by external force, an electric signal is transmitted to the electric circuit board inside the master block 110, whereby the master block 110 is converted from the program mode to the automatic mode.

By using the aforementioned function button 110a, it is possible to instantly execute the automatic mode while the program mode is being executed in the master block 110. By such a function button 110a, there is an effect of significantly increasing user convenience of product usage.

Further, this function button 110a may be provided such that it allows a mobile mode to be selected, that is a mode for controlling the master block 110 in the mobile terminal 150.

Further, such a master block 110 may perform a process of attempting communication connection to the slave block 120 that is located close to the master block 110 to sequentially perceive a unique ID.

For the master block 110 to control the slave block 120, the master block 110 and the slave block 120 must be electrically connected, and for the master block 110 and the slave block 120 to be electrically connected, the master block 110 needs to perform the process of perceiving the unique ID of the slave block 120. If there is only one slave block 120, there is no problem since the master block 110 has only to perform this process once, but if there are a plurality of slave blocks 120, it is not possible to instantly understand which slave block 120 is being perceived, and which unique ID belongs to which slave block 120, thus causing a problem of confusion for the user to write or execute a program for controlling the slave block 120.

The master block 110 according to an embodiment of the present disclosure attempts communication connection to the slave block 120 that is located close to the master block 110 to sequentially perceive a unique ID. By such a master block 110, there is an effect of the user instantly and easily understanding the slave block 120 being perceived and the response of the unique ID.

Further, the master block 110 may be supplied with electric power from a battery block 160 that will be explained hereinafter. On one surface of the battery block 160, a hole is formed, and in this hole, a terminal for transmitting electric power is formed, while at one end of the first protrusion 110b of the master block 110, a terminal corresponding to that terminal in the hole may be formed. The aforementioned one surface where the hole of the battery block 160 is formed is coupled to the one surface where the first protrusion 110b of the master block 110 is formed, whereby a terminal to terminal contact is made, and by such physical contact, electric power can be supplied from the battery block 160 to the master block 110.

Meanwhile, instead of the aforementioned battery block 160, the master block 110 may have a battery for supplying electric power embedded in the electric circuit board inside thereof. Such a battery may be supplied with electric power from outside wiredly via a USB cable or wirelessly through a magnetic induction method.

Further, on a surface of the master block 110, a rectenna may be installed in a coating form. Electromagnetic waves may be collected from outside by such a rectenna, and the electromagnetic waves collected in such a way may charge the battery embedded in the master block 110.

The slave block 120 is configured to execute operation with the information transmitted from the master block 110, or to transmit the collected information to the master block 110, and is thus electrically connected to the master block 110.

Such a slave block 120 may be provided as a polyhedron having a plurality of surfaces just as the master block 110, and here, on any one or more of the plurality of surfaces, a plurality of second protrusions 120b may be formed. Such a second protrusion 120b may be inserted into a groove g formed on another surface of the connecting block 130 that will be explained hereinafter. Meanwhile, into a groove g formed on one surface of the connecting block 130, the aforementioned first protrusion 110b formed on one surface of the slave block 120 may be inserted, and by this coupling, the slave block 120 and the master block 110 may be physically connected to each other.

Such a slave block 120 may be provided as any one of an actuator module or a sensor module. The actuator module may be provided as a DC motor module, Servo motor module, LED (Light Emitting Diode) module, Buzzer module, or the like, and the sensor module may be provided as a light sensor module, distance sensor module, touch sensor module, variable resistive sensor module, or the like. These various types of the slave block 120 are illustrated in detail in FIG. 4.

Meanwhile, on an exterior surface of such a slave block 120, an execution button 120a is provided. When the master block 110 is being executed in the program mode, the execution button 120a generates an electric signal such that a corresponding slave block 120 can be perceived and registered in the master block 110. Here, operations of the slave block 120 are controlled in the scratch program. Further, when the master block 10 is being executed in the automatic mode, the execution button 120a generates an electric signal such that the corresponding slave block 120 can be perceived and registered in the master block 110, and at the same time generates an electric signal to operate the corresponding slave block 120.

That is, by the aforementioned execution button 120a, when the program mode is being executed, it is possible to perceive and register the slave block 120 in the master block 110 by manipulating the execution button 120a only once, thus providing an effect of increasing user convenience, and when the automatic mode is being executed, it is possible to perceive and register the slave block 120 in the master block 110 by pressing the execution button 120a only once, and at the same time operate the slave block 120, thus providing an effect of significantly increasing user convenience.

Further, the slave block 120 may be supplied with electric power from the battery block 160 that will be explained hereinafter. On one surface of the battery block 160, a hole is formed, and in this hole, a terminal for transmitting electric power is formed, and at one end of the second protrusion 120b of the slave block 120, a terminal corresponding to that terminal formed in the hole may be formed. The aforementioned one surface where the hole of the battery block 160 is formed is coupled to the one surface where the second protrusion 120b of the slave block 120 is formed, whereby a terminal to terminal contact is made, and by such physical contact, electric power can be supplied from the battery block 160 to the slave block 120.

Meanwhile, instead of the aforementioned battery block 160, the slave block 120 may have a battery for supplying electric power embedded in the electric circuit board inside thereof. Such a battery may be supplied with electric power from outside wiredly via a USB cable or wirelessly through a magnetic induction method.

Further, on a surface of the slave block 120, a rectenna may be installed in a coating form. Electromagnetic waves may be collected from outside by such a rectenna, and the electromagnetic waves collected in such a way may charge the battery embedded in the slave block 120.

The connecting block 130 is configured to mutually connect the master block 110 and the slave block 120, and to mutually connect a plurality of slave blocks 120. A groove g corresponding to the protrusion is formed on one surface and on another surface such that the surface where the first protrusion 110b is formed and the surface where the second protrusion 120b is formed are coupled to each other while facing each other.

By such a connecting block 130, the user may easily assemble various forms of block coupled bodies such as automobiles, robots, animals and the like.

Meanwhile, such a connecting block 130 may be provided as a polyhedron having a plurality of surfaces just like the aforementioned master block 110 or the slave block 120. As illustrated in (c) of FIG. 2, the connecting block 130 may be provided in a form where a groove g is formed on one surface and on another surface.

Further, the connecting block 130 may be made of a silicon material. By such a connecting block 130 made of silicon material, the space of the groove g itself may be transformed by external force, thus providing an effect of easy coupling and deviation of the first protrusion 110*b* or second protrusion 120*b* and the groove g.

Further, the connecting block 130 may be coupled to a middle block m as illustrated in (d) of FIG. 2. The middle block m may also be provided as a polyhedron having a plurality of surfaces just as the master block 110 or the slave block 120. By such a middle block m and a connecting block 130, the user may assemble various forms of block coupled bodies such as automobiles, robots, animals and the like more broadly and effectively. FIG. 6 illustrates a block coupled body made using such a middle block m and a connecting block 130.

The terminal unit 140 is which drives the scratch program provided for the user to edit a program. The terminal unit 140 may be provided as a desktop PC and notebook PC, etc.

By such a terminal unit 140, the user may use the scratch program to easily edit and execute the program for controlling the master block 110. By controlling and utilizing blocks using the terminal unit 140, the user may effectively learn the concept of IoT technology. FIG. 7 illustrates the screen where the scratch program may be executed in the terminal unit 140.

The mobile terminal 150 is a device for executing an exclusive program for controlling the master block 110. The mobile terminal 150 may be provided as a mobile device such as a smart phone and tablet, etc.

As illustrated in FIG. 8, the exclusive program provides a simple and convenient GUI (Graphical User Interface) so that the user can control the master block 110 intuitively.

Therefore, according to the IoT-based modular robotics system 100 according to an embodiment of the present disclosure, including the master block 110, the slave block 120, the connecting block 130, the terminal unit 140 and the mobile terminal 150, it is possible for the user to instantly execute the program edited by the user in the master block 110 by using the function button 110*a*, and thus there is an advantage that additional control in a PC is unnecessary in order to execute the program edited by the user. This advantage improves user convenience, and accordingly, amplifies users' interests, thereby providing an effect of inducing continued learning by users.

Meanwhile, the IoT-based modular robotics system 100 according to an embodiment of the present disclosure may further include the battery block 160.

Such a battery block 160 is configured to transmit electric power to the master block 110 and to the slave block 120, and is coupled to the master block 110 or the slave block 120.

On one surface of such a battery block 160, a hole is formed, and in this hole, a terminal for transmitting electric power is formed, while at one end of the first protrusion 110*b* of the master block 110, or at one end of the second protrusion 120*b* of the slave block 120, a terminal corresponding to that terminal in the hole may be formed. The aforementioned one surface where the hole of the battery block 160 is formed is coupled to the one surface where the first protrusion 110*b* of the master block 110 is formed, or to the one surface where the second protrusion 120*b* of the slave block 120 is formed, whereby a terminal to terminal contact is made, and by such physical contact, electric power can be supplied from the battery block 160 to the master block 110 and to the slave block 120.

Meanwhile, the IoT-based modular robotics system 100 according to an embodiment of the present disclosure may further include a case unit 170.

Such a case unit 170 is configured to accommodate and store the aforementioned master block 110, slave block 120 and middle block m. A plurality of divided storage spaces are formed in the case unit 170.

In these storage spaces, a hole is formed where the protrusion formed in the master block 110, slave block 120 or middle block m may be inserted. When the master block 110, slave block 120 or middle block m is inserted and accommodated into this storage space, the master block 110, slave block 120 or middle block m may be stored with stability, thus providing an effect of not easily losing the blocks.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. An Internet of Things based modular robotics system, the system comprising: a master block for receiving input of a program edited by a user and a predetermined program, and for executing the program edited by the user and the predetermined program, and which is provided with a function button for changing from a program mode that is a mode for executing the program edited by the user to an automatic mode that is a mode for executing the predetermined program; a slave block that is electrically connected to the master block to receive information from the master block to execute operation of the slave block, or to transmit information to the master block; and a connecting block that mutually connects the master block and the slave block, or mutually connects a plurality of slave blocks, wherein the slave block has, on an exterior surface of the slave block, an execution button for executing communication connection of the master block and the slave block, and the execution button executes operation of the slave block when pressed by external force in a case where the master block is being executed in the automatic mode.

2. The Internet of Things based modular robotics system according to claim 1, wherein the slave block is provided as one of an actuator module or a sensor module.

3. The Internet of Things based modular robotics system according to claim 2, wherein the master block is provided as a polyhedron having a plurality of surfaces, a first protrusion formed on any one surface of the plurality of surfaces, the slave block is provided as a polyhedron having a plurality of surfaces, a second protrusion formed on any one surface of the plurality of surfaces, and the connecting block has a groove corresponding to the protrusion on one surface and on another surface of the connecting block such that the surface where the first protrusion is formed and the surface where the second protrusion is formed are coupled to each other while facing each other.

4. The Internet of Things based modular robotics system according to claim 3, further comprising a terminal unit for driving a scratch program provided for a user to edit the program.

5. The Internet of Things based modular robotics system according to claim 4, wherein, when there are a plurality of slave blocks, the master block attempts communication connection to the slave block located in a closest distance, of the plurality of slave blocks.

6. The Internet of Things based modular robotics system according to claim 5, wherein the function button performs changing of a mobile mode that is a mode for controlling the master block in a mobile terminal.

7. The Internet of Things based modular robotics system according to claim 6, wherein the master block and the slave block charge electric power in a magnetic induction method.

8. The Internet of Things based modular robotics system according to claim 6, further comprising a battery block coupled to the master block or to the slave block to transmit electric power to the master block and the slave block.

* * * * *